Nov. 13, 1962     R. G. POLANSKY     3,063,283
PHYSIOLOGICAL INSTRUMENTATION CHECKOUT APPARATUS
Filed May 12, 1961
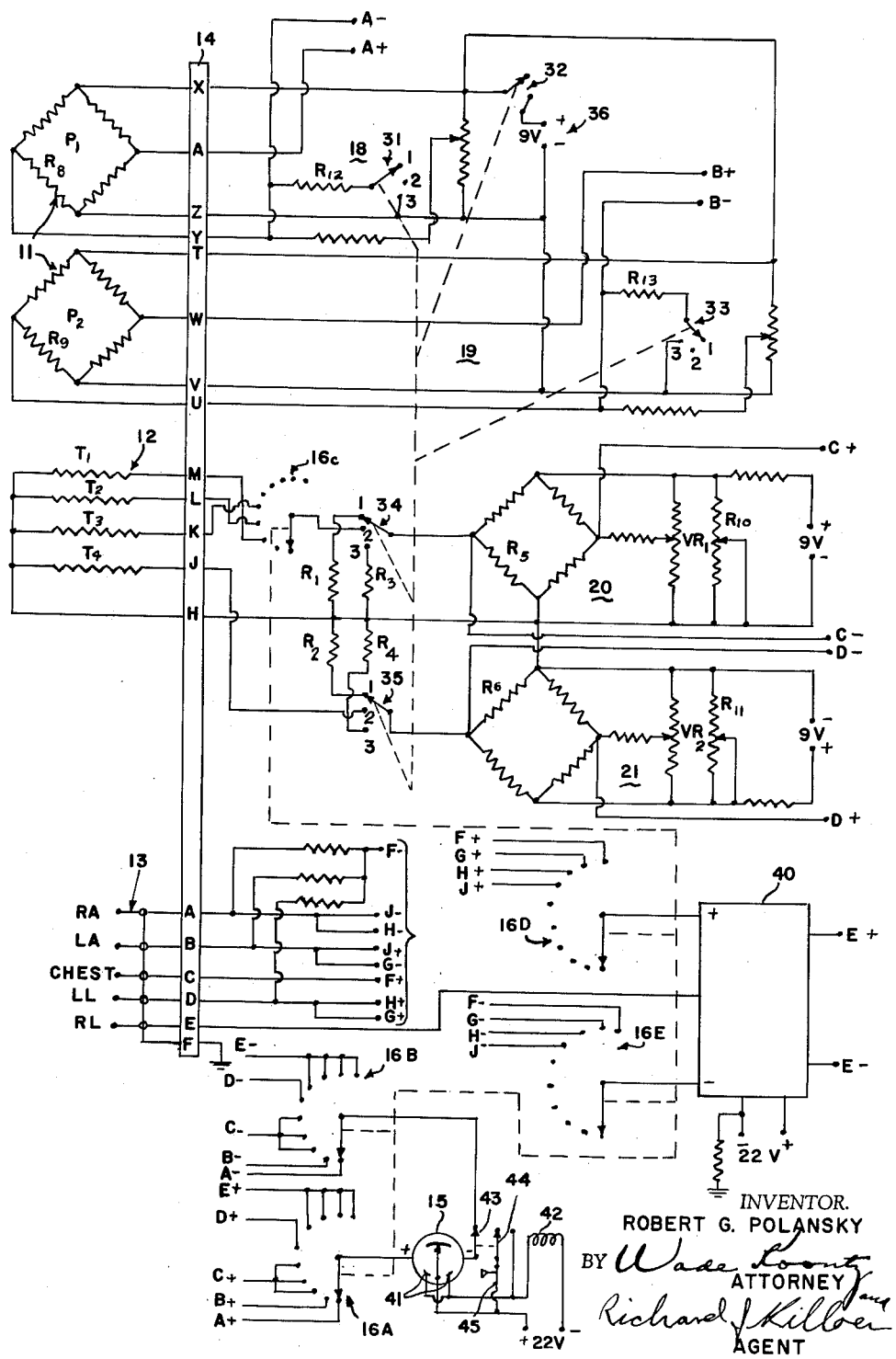
INVENTOR.
ROBERT G. POLANSKY
BY
ATTORNEY
AGENT

United States Patent Office 3,063,283
Patented Nov. 13, 1962

3,063,283
PHYSIOLOGICAL INSTRUMENTATION CHECK-
OUT APPARATUS
Robert G. Polansky, Edwards, Calif., assignor to the
United States of America as represented by the Secretary of the Air Force
Filed May 12, 1961, Ser. No. 110,276
2 Claims. (Cl. 73—1)
(Granted under Title 35, U.S. Code (1952), sec. 266)

The invention described herein may be manufactured and used by or for the United States Government for governmental purposes without payment to me of any royalty thereon.

This invention relates to an apparatus for checking physiological instrumentation for a pilot to determine if it is working properly.

One object of the invention is to provide for checking a pilot's physiological instrumentation which makes it unnecessary for the pilot to check his instrumentation in the aircraft.

This and other objects will be more fully understood from the following detailed description taken with the drawing wherein: the single FIGURE shows a circuit schematic of the instrumentation checking device of the invention.

Previously if it was desired to check the pilot's physiological instrumentation, it was necessary for the pilot to be instrumented and suited up. He then had to get into his aircraft, connect his instrumentation plug into the telemetering or recording system in the aircraft and actually supply his signals to the system. If everything was not working properly, it was necessary for him to leave the aircraft to have the faulty channels checked and corrected. This was a very time consuming process. With the device of this invention, the instrumentation can be checked without the necessity of the pilot getting into the aircraft.

Referring now to the drawing, reference numeral 11 refers to differential pressure transducers used in the pilot's physiological test equipment. Body temperature measuring thermistors are indicated at 12 and electrocardiagraph electrodes are indicated generally at 13. The output from these is connected to the checking circuit by means of a plug connector shown schematically at 14. A meter 15 has two banks 16A and 16B, of a five bank switch, connected to its positive and negative leads, respectively. The output leads of pressure sensing device $P_1$ is connected to switches 16A and 16B by means of corresponding leads indicated as A— and A+. Pressure sensing device $P_2$ is connected to switches 16A and 16B by means of leads indicated as B+ and B—. Thermistors $T_1$, $T_2$, and $T_3$ are selectively connected to corresponding leads C+ and C—, switches 16A and 16B through the leads indicated as C+ and C—. Thermistor element $T_4$ is connected to leads of switches 16A and 16B through the leads indicated at D+ and D—. The electrocardiagraph terminals indicated at 13 are connected to leads E+ and E— on switches 16A and 16B through leads indicated E+ and E—. Calibration circuits for the pressure sensing elements $P_1$ and $P_2$ are indicated generally at 18 and 19. Reference numerals 20 and 21 indicate calibration and bridge circuits for the thermistor elements $T_1$, $T_2$, $T_3$ and $T_4$. Calibration switch contacts 31, 32, 33, 34 and 35 which are ganged together are shown as being connected in their zero calibration position. As can be seen in this position, the pressure sensing circuits $P_1$ and $P_2$ are disconnected from the power supply indicated at 36 by a switch 32. With the switches 34 and 35 connected in zero position, resistors $R_1$ and $R_2$ are connected across the measuring resistances $R_5$ and $R_6$ in the bridge circuit. With the switch in this position, potentiometers $VR_1$ and $VR_2$ are adjusted to balance the bridge. With the switches 31 through 35 in position 3, which is the calibrated position, resistors $R_{12}$ and $R_{13}$ are connected across the resistors $R_8$ and $R_9$ of the pressure measuring elements $P_1$ and $P_2$, respectively. In the circuits 20 and 21, the resistors $R_3$ and $R_4$ are connected across the resistors $R_5$ and $R_6$. Resistors $R_{10}$ and $R_{11}$ are adjusted to provide the proper reading on meter 15. The thermistors $T_1$, $T_2$ and $T_3$ are connected to the middle contact on switch 34 by means of switch bank 16C on the ten position switch so that they are selectively connected to corresponding terminals on banks 16A and 16B as the ten position switch is rotated to these positions. The electrocardiagraph electrodes 13 are selectively connected to the meter 15 through switch banks 16D and 16E. Electrocardiagraph electrodes 13 are selectively connected to switches 16D and 16E through correspondingly marked terminal leads F+, G+, H+ and J+ and F—, G—, H— and J—. The output switches 16D and 16E are connected to the meter 15 through an electrocardiagraph amplifier 40. This amplifies signals picked up from the body electrodes 13 to a level that can be observed on the meter 15. Since abnormal conditions in any of the circuits may produce readings on the meter 15 which would cause the meter to go off scale and thus damage the meter, sensing elements 41 operate relay 42 and thus open relay circuit switch 43 and close relay holding contact 44. This will keep the meter out of the circuit until the fault has been corrected. A reset switch 45 acts to re-engage the meter by breaking the circuit through relay 42.

In the operation of the device, the circuit is calibrated for zero and maximum readings prior to use. After the pilot's plug is connected into plug connector 14, the switches 31 through 35 are switched to zero and calibrate position to obtain reference output indications for the pressure element $P_1$ measurement. These switches are then switched to the operating position and readings are taken to check the $P_1$ pressure equipment. This sequence is then followed for each of the ten contact positions of the five bank switch. If the meter returns to zero or goes off scale for any of the circuits 18, 19, 20 or 21, the trouble must be found and corrected. The meter can then be reset and another test should be made on the circuit. When checking the electrocardiagraph circuit, several seconds should elapse before each reading is taken. After this reading period, the reset button should be pressed and the ECG pulses should be observed. If no pulse is observed or if the D.C. output level is erratic, the wiring of the electrode to the plug 14, electrode locations, and moisture in the electrode plates should be checked. This same procedure should be followed for all the positions F, G, H and J of switch banks 16D and 16E, which corresponds to the contacts connected to E+ and E— on switch banks 16A and 16B.

There is thus provided a means for checking a pilot's physiological instrumentation which makes it unnecessary for the pilot to check his instrumentation while in the aircraft.

While certain specific embodiments have been described in detail, it is obvious that numerous changes may be made without departing from the general principle and scope of the invention.

I claim:
1. A device for checking a pilot's physiological equipment including pressure sensing apparatus, temperature sensing apparatus and electrocardiagraph electrodes, comprising: a meter; a plural bank plural position switch; means for connecting the common electrode of a first bank of said plural bank switch to the positive terminal of said meter; means for connecting the common termi- nal of a second bank of said plural bank switch to the negative terminal of said meter; means for connecting said pressure sensing apparatus to predetermined corresponding contacts of said first and second banks; a calibration circuit for said pressure sensing apparatus; means for selectively connecting said calibration circuit into the circuit between said pressure sensing apparatus and one of said first and second banks of said plural bank switch; means for connecting the output of said temperature sensing apparatus to other predetermined corresponding contacts on said first and second banks of said plural bank switch; calibrating circuit means connecting in the circuit between said temperature sensing means and said first and second banks of said plural bank switch; a differential amplifier; means for connecting the positive terminal of said differential amplifier to the common terminal of a third bank of said plural bank switch; means for connecting the common terminal of a fourth bank of said plural bank switch to the negative terminal of said differential amplifier; means for connecting the output of said differential amplifier to other predetermined corresponding contacts on the first and second banks of said plural bank switch; means for connecting the electrocardiagraph electrodes to predetermined contacts on the third and fourth banks of said plural bank switch; means mounted on said meter for sensing overload in said meter; a relay element, responsive to output of said sensing means, for opening the circuit between one of the terminals of said meter and the common terminal of one of said first and second banks of said plural bank switch; and manual means for breaking the circuit through said relay element when it is desired to reclose said meter circuit.

2. A device for checking a pilot's physiological equipment including plural pressure sensing apparatus, plural temperature sensing apparatus and plural electrocardiagraph electrodes, comprising: a meter; a five bank ten position switch; means for connecting the common electrode of the first bank of said five bank switch to the positive terminal of said meter; means for connecting the common terminal of a second bank of said five bank switch to the negative terminal of said meter; means for connecting said pressure sensing apparatus to predetermined corresponding contacts of said first and second banks; a calibration circuit for each pressure sensing apparatus; means for selectively connecting said calibration circuits into the circuit between each pressure sensing apparatus and corresponding contacts of said first and second banks of said five bank switch; means for connecting the output of said temperature sensing apparatus to other predetermined corresponding contacts on said first and second banks of said five bank switch; a plurality of circuit calibrating means for said temperature sensing means; means, including a fifth bank of said five bank switch, for selectively connecting one of the last mentioned calibration circuits into the circuit between certain of said temperature sensing means and the corresponding contacts of said first and second banks of said five bank switch; a differential amplifier; means for connecting the positive terminal of said differential amplifier to the common terminal of a third bank of said five bank switch; means for connecting the common terminal of a fourth bank of said five bank switch to the negative terminal of said differential amplifier; means for connecting the output of said differential amplifier to other predetermined corresponding contacts on the first and second banks of said five bank switch; means for connecting the electrocardiagraph electrodes to predetermined contacts on the third and fourth banks of said five bank switch; means mounted on said meter for sensing overload in said meter; a relay element responsive to output of said sensing means for opening the circuit between one of the terminals of said meter and the common terminal of one of said first and second banks of said five bank switch; and manual means for breaking the circuits through said relay element when it is desired to reclose said meter circuit.

References Cited in the file of this patent
UNITED STATES PATENTS

| | | |
|---|---|---|
| 2,570,781 | Duerr | Oct. 9, 1951 |
| 2,886,776 | Knudsen | May 12, 1959 |